Figure 1:
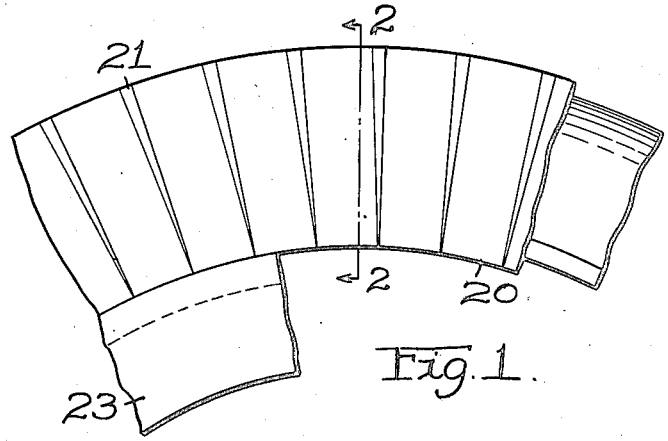

H. A. W. WOOD.
TIRE WRAPPER.
APPLICATION FILED MAR. 31, 1915.

1,165,644.

Patented Dec. 28, 1915.
2 SHEETS—SHEET 1.

Witness:
C. F. Nesson.

Inventor
H. A. W. Wood.
By attorneys
Southgate & Southgate

H. A. W. WOOD.
TIRE WRAPPER.
APPLICATION FILED MAR. 31, 1915.

1,165,644.

Patented Dec. 28, 1915.
2 SHEETS—SHEET 2.

Witness:
C. F. Messon

Inventor:
H. A. W. Wood
by attorneys
Southgate & Southgate

UNITED STATES PATENT OFFICE.

HENRY A. WISE WOOD, OF NEW YORK, N. Y.

TIRE-WRAPPER.

1,165,644.　　　　Specification of Letters Patent.　　Patented Dec. 28, 1915.

Application filed March 31, 1915.　Serial No. 18,249.

*To all whom it may concern:*

Be it known that I, HENRY A. WISE WOOD, a citizen of the United States, residing at New York, in the county of New York and State of New York, have invented a new and useful Tire-Wrapper, of which the following is a specification.

This invention relates to a wrapper particularly adapted for inclosing pneumatic tires or tubes or other similar annular articles. In preparing such articles for shipment it has been customary to wind a long narrow strip of paper spirally about the article until the entire surface thereof was covered. This method of wrapping consumes a great deal of time and is also unsatisfactory for other reasons. The spiral wrapping presents a series of loose edges which are easily torn and which also admit air, light and dirt to the inclosed article. It is a well known fact that rubber deteriorates to a certain extent when exposed to either light or air, and the spiral wrapping is therefore particularly unsatisfactory when used to protect articles made of such material.

It is the object of my present invention to provide a wrapper of improved construction which may be quickly and easily applied and which, when so applied, will exclude air, light and dirt from the inclosed article.

It is also the object of my invention to provide a wrapper that shall require less material than is contained in the spiral wrappings now in universal use, thus greatly reducing the waste of wrapping material.

With this general object in view, my invention in its broad aspect, consists of a tire wrapper formed of one or more pieces of suitable sheet material extending longitudinally of the wrapper, certain portions of said wrapper being freely expansible lengthwise of the wrapper, and the remaining portion or portions of said wrapper being of fixed length.

My invention is further characterized by the fact that when the wrapper is not in use its several parts lie substantially in a single plane, whereby the shipment and storage of said wrappers is much facilitated.

Several forms of my invention are shown in the drawings in which—

Figure 2:
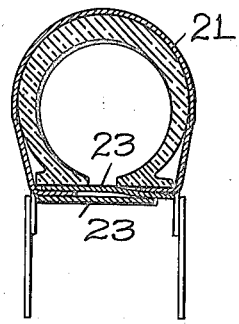
Figure 3:
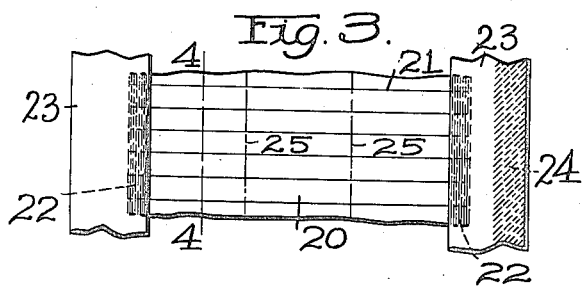
Figure 4:
Figure 5:
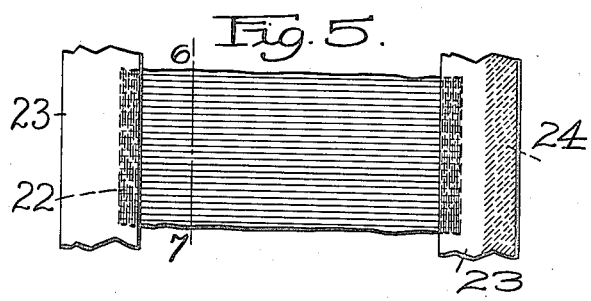
Figure 6:
Figure 8:
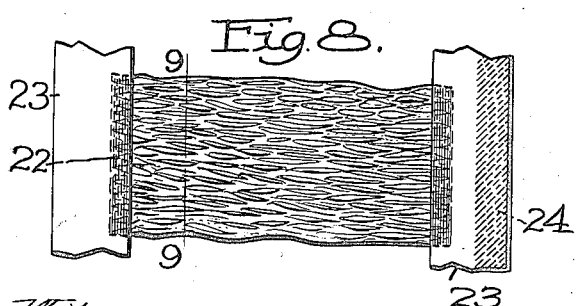
Figure 7:
Figure 9:
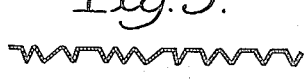
Figures 10, 11:
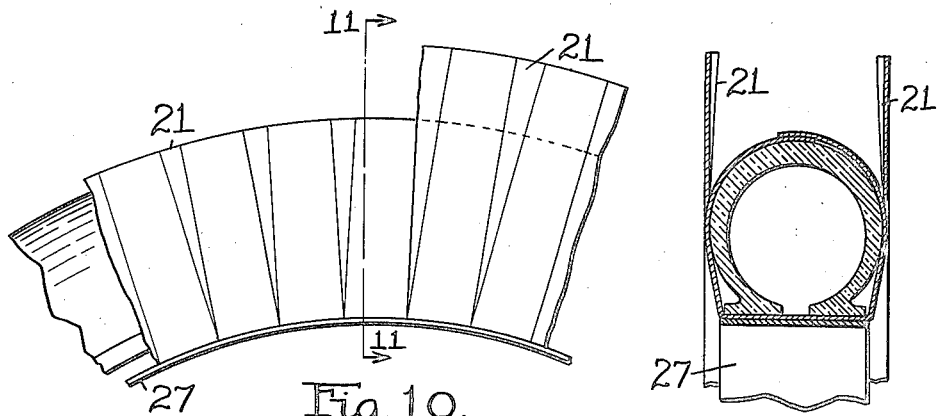
Figure 12:
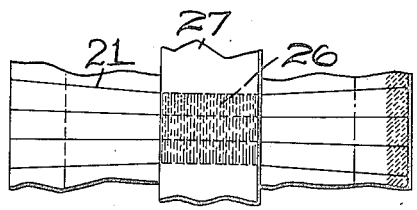
Figure 13:
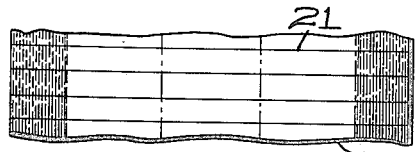
Figure 14:
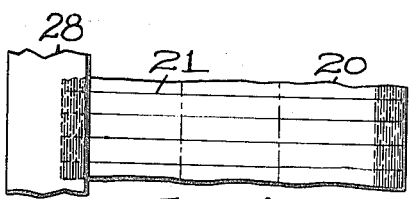
Figure 15:
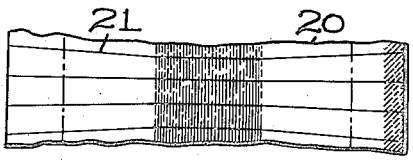

Figure 1 is a side elevation of a section of a pneumatic tire with a portion of one form of my improved wrapper applied thereto; Fig. 2 is a sectional view taken along the line 2—2 in Fig. 1, looking in the direction of the arrow; Fig. 3 is a plan view of a transverse portion of the wrapper shown in Fig. 1; Fig. 4 is a detail sectional view taken along the line 4—4 in Fig. 3; Fig. 5 is a view similar to Fig. 3 but showing the use of fluted material to form the expansible portion of the wrapper; Figs. 6 and 7 are sectional views, each taken on the line 6—7 in Fig. 5, and showing two of the many optional forms of flutes; Figs. 8 and 9 are views similar to Figs. 3 and 4, but show the use of irregularly-creased or "crêpe" paper as a substitute for the plaited form; Figs. 10, 11 and 12 are views of a modified form of my invention, corresponding in position to Figs. 1, 2 and 3; and Figs. 13, 14 and 15 are views corresponding to Fig. 3 but showing additional modifications.

In the form of my invention shown in Figs. 1 to 4, my improved tire wrapper comprises a straight longitudinally-extended sheet 20 of paper or other suitable material formed into a plurality of transverse plaits 21, the folded position of these plaits being clearly shown in Fig. 4. At the opposite longitudinal edges of the sheet the plaits may be pasted together as indicated at 22, if its side strips are not to be used, but the plaits are left unsecured in their central portion and are thus capable of longitudinal extension in said central portion. Longitudinal strips 23 of suitable material may be secured to the portions 22 of the sheet 20, said strips extending laterally beyond the ends of the plaits 21. When these strips are used it is not necessary to paste the plaits together at their ends along the portion 22, as these plaits may be pasted to the longitudinal strips 23. One of the strips 23 may be provided with a gummed surface 24 at the outer edge thereof, if so desired.

The wrapper above described may be readily formed by suitable machinery, either with or without the longitudinal strips in the form of a continuous strip of any desired length, which strip will be substantially flat and may thus be conveniently made up into rolls or bundles for storage or shipping.

The width of the sheet 20 will vary to correspond to the circumference of a cross section of the tire or other article to be inclosed, but it is unnecessary to provide wrappers of different lengths for different sizes of tires, as any suitable length may be cut from the continuous sheet in accordance with the size of the tire to be inclosed. A suitable length of wrapper having been provided, the wrapper is placed upon the outside or tread of the tire and is drawn taut until its center section is properly extended, when its sides are folded down along the sides thereof and are thereafter lapped upon its inner surface, as clearly shown in Fig. 2. The wrapper may be scored longitudinally at a plurality of points as 25 to permit it to be bent easily about the tire. Having positioned the wrapper upon the tire, it is then merely necessary to moisten the gummed portion 24 and to press the end of the opposite strip 23 thereupon in order to secure the wrapper in place. As the wrapper is bent around the sides of the tire, the plaited portions will be extended, as indicated in Fig. 1, to conform to the circumferential distance at different points around the cross section of the tire. The tire thus inclosed will be effectually sealed against the entrance of air, light or dirt, and moreover there are no loose edges at which points the wrapper may be easily torn. The outer surface of the strip 23 provides a suitable place for the inscription of advertising matter or other designating markings and this strip being within the tire is not readily soiled or disfigured. The pasting of the plaits 21 to each other at their end portions is desirable but not essential and they may be merely secured to the strips 23 if so desired. A wrapper may be made in this way at slightly less expense.

In the form above described, as shown in Figs. 1 to 4, the sheet material is folded into transversely - extending over - lapping plaits 21. While this construction is effective and satisfactory, it should be understood that my invention in its broad features, is not limited thereto, and that any other suitable material or arrangement thereof may be substituted for the plaited material above described. For example, in Fig. 5 I have shown the expansible portion formed of material fluted or creased transversely in closely adjacent parallel lines, but omitting the reverse folds of the plaited form, and in Figs. 6 and 7 I have shown in cross-section two of the many forms which these flutes may be made to assume.

In Figs. 8 and 9 I have indicated in plan and cross-section the use of irregularly-creased material of the type commonly designated by the term "crêpe". This form is similar to that of Figs. 5, 6 and 7, except that the creases are irregularly disposed and do not extend in unbroken lines from edge to edge of the material. These several forms of material may perhaps be best described by the generic term "gathered". Any successful embodiment of my invention necessitates the use of some form of extensible material normally lying in a single plane and having one or more longitudinally - extending portions, expansible with little reference to the other portions of the wrapper. To attain this result without using material which is inherently elastic, I find it necessary to "gather" the material either into plaits, flutes, or creases, in order that the requisite surplus material may be disposed in a single plane and that it may be available to permit necessary expansion of the wrapper in any portion thereof.

Referring now to the form shown in Figs. 10, 11 and 12, the general features of construction are similar to the form shown in Figs. 1 to 4 but the details are slightly varied. In this form, the plaits 21 are secured together at their central portion 26 rather than at the ends, as previously described, a narrow strip of material 27 if desired being thereafter secured to the pasted portion. A coating of gum may be provided along one edge of the plaited portion and if so provided, it may be applied and thoroughly dried before the paper is plaited. The pasting of the plaits to each other is optional, as in the form first described. In applying this form of wrapper, as shown in Fig. 11, the wrapper is placed within the tire and is thereafter bent outwardly along the sides of the tire and over the tread thereof, the parts being thereafter secured by moistening the gummed surface and pressing the free end thereon. In this form the strip 27 provides a convenient place for advertising matter and the form is furthermore advantageous in providing a double layer of material to protect the outer portion or tread of the tire. Printed matter may also be placed upon the sheet material before it is gathered, in such position that it will appear along the tread of the tire after the wrapper is applied, the gathered material at this point being extended to form a substantially continuous surface when the wrapper is in position upon the tire. Similarly printed matter may be placed upon the sheet material 20 of the form shown in Figs. 1 to 4 before it is gathered, so that when the material is extended along the tread of the tire, the printed matter will appear in proper form.

In Fig. 13 I have shown a form of wrapper similar to the preferred form of Figs. 1 to 4 but simplified by the omission of the strips 23. In this form the gathered portion is necessarily of greater breadth in order to provide sufficient lap for securing the wrapper in position.

In the form shown in Fig. 14 a single strip 28 is provided at one side of the wrapper, this form being thus intermediate between the forms shown in Figs. 3 and 13.

The form shown in Fig. 15 is similar to that shown in Fig. 12 but omits the longitudinally extending strip 27.

It will be understood that one edge of each of the modified forms may be provided with a gummed surface as in the forms previously described. It will be also understood that any suitable normally-flat gathered material may be used in any of the several suggested forms of my invention, the plaited form being chosen for convenience of illustration only in most of the figures.

From the foregoing description, it will be seen that I have provided a wrapper for tires and other annular objects which can be cheaply and easily manufactured, upon which advertising matter may be easily printed and displayed, which may be stored in convenient form, which economizes paper, and which may be applied for use with a minimum expenditure of time and labor.

Having thus described my invention it will be evident that other changes and modifications can be made therein without departing from the spirit and scope thereof as set forth in the claims, and I do not wish to be otherwise limited to the details herein disclosed, but

What I do claim is:—

1. As an article of manufacture, a wrapper for annular articles formed of sheet material and comprising a continuous expansible portion and a portion of fixed length, each of said portions extending longitudinally of said wrapper, and all parts of said wrapper being normally disposed substantially in a single plane when the wrapper is not in use.

2. As an article of manufacture, a wrapper for annular articles comprising a normally-flat straight length of gathered sheet material, a limited continuous portion of said sheet being freely extensible longitudinally and the remaining portion being of fixed length.

3. As an article of manufacture, a wrapper for annular objects formed of straight strips of sheet material extending longitudinally of said wrapper, and having continuous expansible and non-expansible portions disposed side by side and extending longitudinally thereof.

4. As an article of manufacture, a wrapper formed of one or more straight lengths of sheet material and comprising a transversely gathered expansible portion and a portion of fixed length, each of said portions extending longitudinally of said wrapper.

5. As an article of manufacture, a wrapper comprising a length of sheet material formed into a succession of transverse gathers, said gathers being permanently secured to each other throughout a section extending longitudinally of said sheet to render said section non-extensible and the remaining portions of said gathers being freely extensible longitudinally of said sheet.

6. As an article of manufacture, a wrapper comprising a length of sheet material formed into a succession of transverse gathers, said gathers being secured together throughout a section extending longitudinally of said sheet and having a narrow strip of sheet material covering said secured portion on one face of said sheet, other portions of said gathers being freely extensible longitudinally of said sheet.

7. As an article of manufacture, a wrapper formed of sheet material and having an expansible center portion, and non-expansible side portions disposed side by side and extending longitudinally of said wrapper, all of said portions being normally disposed in a single plane when the wrapper is not in use.

8. As an article of manufacture, a wrapper comprising a length of sheet material formed into a succession of transverse gathers, said gathers being permanently secured to each other throughout sections extending longitudinally along each edge of said sheet whereby said sections are fixed in length.

9. As an article of manufacture, a wrapper comprising a length of sheet material formed into a succession of transverse gathers, held together throughout sections extending longitudinally along each edge of said sheet, and having a strip of sheet material extending longitudinally of said sheet at one edge thereof, and secured to one of said non-extensible sections.

10. As an article of manufacture, a wrapper comprising a length of sheet material formed into a succession of transverse gathers, said gathers being secured together throughout sections extending longitudinally along each edge of said sheet and having a narrow strip of sheet material extending longitudinally of said sheet at one edge thereof, covering and attached to one of said secured sections and extending laterally beyond the edge of said sheet.

11. As an article of manufacture, a wrapper comprising a length of sheet material formed into a succession of transverse gathers, said gathers being secured together throughout sections extending longitudinally along each edge of said sheet, and having a narrow strip of sheet material extending longitudinally of said sheet at each edge thereof, covering and attached to said secured sections and extending laterally beyond both edges of said sheets.

12. As an article of manufacture, a wrapper comprising a length of sheet material formed into a succession of transverse gathers held together throughout sections extending longitudinally along each edge of said sheet, one face of one edge portion being gummed for securing said wrapper in place.

13. As an article of manufacture, a wrapper comprising a length of sheet material formed into a succession of transverse gathers, said gathers being secured together throughout a section extending longitudinally along each edge of said sheet, and having a narrow strip of sheet material extending longitudinally of said sheet at each edge thereof, covering and attached to said secured sections and extending laterally beyond the edges of said sheet, one face of one of said narrow strips being gummed for securing said wrapper in place.

14. As an article of manufacture, a wrapper comprising a gathered expansible portion extending longitudinally thereof and a portion of fixed length also extending longitudinally and having a smooth continuous surface adapted to receive designating markings, said portions being normally disposed substantially in the same plane throughout the length of the wrapper, when the latter is not in use.

15. As an article of manufacture, a wrapper comprising a length of sheet material formed into a succession of transverse gathers, said sheet being scored longitudinally to facilitate bending, a portion of said sheet being freely extensible longitudinally and the remaining portion of said sheet being of fixed length.

16. As an article of manufacture, a wrapper made of sheet material forming substantially a plane surface and so constructed that when a longitudinally extending portion thereof is distended said wrapper will assume the form of a tubular ring.

In testimony whereof I have hereunto set my hand, in the presence of two subscribing witnesses.

HENRY A. WISE WOOD.

Witnesses:
BLODWEN W. JONES,
ANNA M. BLESSING.